UNITED STATES PATENT OFFICE.

GEORGE W. BARLOW, OF NEW YORK, N. Y.

SOLUBLE LAUNDRY-BLUE.

SPECIFICATION forming part of Letters Patent No. 351,484, dated October 26, 1886.

Application filed November 30, 1885. Serial No. 184,331. (Specimens.)

*To all whom it may concern:*

Be it known that I, GEORGE W. BARLOW, of the city and State of New York, have invented an Improvement in Soluble Laundry-Blue, of which the following is a specification.

The blue that is used for laundry purposes is sometimes in the form of a liquid in bottles. In this condition the bottles are liable to be broken, either in handling or by the action of frost, and the cost of the bottle increases the expense to the consumer. In cases where the blue has been put up in cakes or balls it has usually been mixed with starch or similar material; but this lessens the amount of coloring-matter in each package, and the starch prevents the blue becoming dissolved easily in water. In the manufacture of tube-colors glycerine has been employed, but the same is in sufficient quantity to render the color plastic.

My invention relates to a method of making laundry-blue by which it is rendered better for the purposes intended, and is free from the objections inherent in the articles heretofore made. I employ the ordinary soluble blue of commerce, in a dry and finely-powdered condition, and glycerine in the proportion of about one part of glycerine to three parts, by weight, of blue-powder, and these I grind or mix together; but usually this glycerine is insufficient in quantity to cause the mass to work easily while being mixed. I therefore generally add a small quantity of water, about one-quarter part to the aforesaid material. This unites with the glycerine and causes its uniform distribution throughout the blue, and renders the mass sufficiently plastic to be mixed thoroughly and then molded and pressed into balls or cakes. These balls or cakes are preferably spread upon trays and exposed sufficiently for the water to evaporate, and the laundry-blue is then ready for packing for market and sale. It will be found that these cakes of laundry-blue are sufficiently solid to bear transportation without breaking. They are easily handled, and can be tied in a flannel bag and dipped into the water that is to be blued; or they can be dissolved in water in a bottle and used as required. The glycerine aids in preventing the color precipitating, and acts to render the color more perfectly soluble in the water, and the glycerine, when used as aforesaid, acts to keep the coloring-matter in the condition of a cake or ball, and the cost of manufacture is small.

I claim as my invention—

The method herein specified of making laundry-blue, consisting in intimately mixing soluble blue-powder with glycerine in about the proportion of one part of glycerine to three of blue, and pressing the mass into balls or cakes, substantially as set forth.

Signed by me this 27th day of November, A. D. 1885.

G. W. BARLOW.

Witnesses:
GEO. T. PINCKNEY,
WALLACE L. SERRELL.